United States Patent
Rychtarik

(10) Patent No.: US 8,130,381 B2
(45) Date of Patent: Mar. 6, 2012

(54) OPTICAL FIBER PROBE

(75) Inventor: David Rychtarik, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 11/974,434

(22) Filed: Oct. 11, 2007

(65) Prior Publication Data
US 2008/0285047 A1 Nov. 20, 2008

(30) Foreign Application Priority Data
Oct. 12, 2006 (DE) .......................... 10 2006 048 317

(51) Int. Cl.
*G01B 9/02* (2006.01)
(52) U.S. Cl. ........................................ 356/477; 356/73.1
(58) Field of Classification Search .................. 356/73.1, 356/460, 477, 485, 479, 511; 250/461.2, 250/458.1, 227.14, 227.18; 385/12–13, 123, 385/43, 27
See application file for complete search history.

(56) References Cited

U.S. PATENT DOCUMENTS

| | | | |
|---|---|---|---|
| 4,390,897 A * | 6/1983 | Smithgall, Sr. ................. | 348/95 |
| 4,760,845 A * | 8/1988 | Kovalcheck .................... | 606/28 |
| 5,057,099 A * | 10/1991 | Rink ............................... | 606/12 |
| 5,361,314 A * | 11/1994 | Kopelman et al. .............. | 385/12 |
| 5,557,406 A * | 9/1996 | Taylor et al. ................... | 356/477 |
| 5,598,005 A * | 1/1997 | Wang et al. .................. | 250/459.1 |
| 5,627,922 A * | 5/1997 | Kopelman et al. .............. | 385/12 |
| 5,812,722 A * | 9/1998 | Anazawa et al. ............. | 385/123 |
| 6,124,597 A * | 9/2000 | Shehada et al. ............ | 250/461.2 |
| 6,239,868 B1 * | 5/2001 | Jung et al. ........................ | 356/73 |
| 6,398,777 B1 * | 6/2002 | Navarro et al. .................... | 606/7 |
| 6,490,378 B2 * | 12/2002 | Walter et al. ..................... | 385/13 |
| 6,574,401 B2 * | 6/2003 | Neuberger et al. ............ | 385/117 |
| 6,741,355 B2 * | 5/2004 | Drabarek ....................... | 356/482 |
| 7,440,788 B2 * | 10/2008 | Jenkins et al. ................. | 600/344 |
| 2008/0144040 A1 * | 6/2008 | Drabarek et al. .............. | 356/477 |

FOREIGN PATENT DOCUMENTS

| | | |
|---|---|---|
| DE | 10244553 | 2/2004 |
| JP | 62173402 A * | 7/1987 |
| JP | 2005265772 A * | 9/2005 |

* cited by examiner

*Primary Examiner* — Sang Nguyen
(74) *Attorney, Agent, or Firm* — Kenyon & Kenyon LLP

(57) ABSTRACT

An optical fiber probe for an optical measuring device having a mechanical receptacle into which an optical fiber is inserted, having a fiber end piece which projects over the mechanical receptacle and is designed for guiding a measuring beam onto a measuring object. In the area of the fiber end piece and/or in the area of the mechanical receptacle, the optical fiber is provided, at least regionally, with coating that stabilizes it. The coating provides the fiber end piece with improved mechanical stability and reduced tendency to vibrate, making it possible to make it substantially longer than without the coating.

10 Claims, 2 Drawing Sheets

OPTICAL FIBER PROBE

FIELD OF THE INVENTION

The present invention relates to an optical fiber probe for an optical measuring device having a mechanical receptacle into which an optical fiber is inserted, having a fiber end piece which projects over the mechanical receptacle and is designed for guiding a measuring beam onto a measuring object.

BACKGROUND INFORMATION

An interferometric measuring device in which such a fiber probe is used is described in German Patent No. DE 102 44 553. That document describes an interferometric measuring device for detecting the shape, the roughness, or the distance from the surface of a measured object using a modulation interferometer, to which a short-coherent radiation is supplied by a radiation source and which has a first beam splitter for splitting the supplied radiation into a first partial beam conducted via a first arm and a second partial beam conducted via a second arm, the light phase or light frequency of one of the partial beams being shifted with respect to the other by a modulation device and this beam passing through a delay segment, the two partial beams being subsequently combined in a further beam splitter of the modulation interferometer, having a measuring probe spatially separated from the modulation interferometer and connected or connectable thereto via a fiber optic device in which the combined partial beams are split into a measuring beam conducted to the surface by a fiber optic probe device having an oblique object-side exit surface and a reference beam and in which the measuring beam ($r_1(t)$) reflected on the surface and the reference beam ($r_2(t)$) reflected on a reference plane are superimposed, and having a receiving device and an analyzing unit for converting the radiation supplied thereto into electrical signals and for analyzing the signals on the basis of a phase difference. The angle of inclination (y) of the exit surface is at least 46° with respect to the normal to the optical probe axis.

According to FIGS. 5 and 6 shown in the document, the oblique exit surface of an object-side optical fiber probe unit projects over a tube-shaped receptacle in such a way that the outstanding optical fiber probe unit, i.e., the fiber end piece, can be introduced into narrow cavities, for example for optical, in particular interferometric, measuring functions.

The depth of the cavity to be tested is limited by the length of the fiber end piece. In optical fiber probe units used today, the length of the fiber end piece for a typical fiber diameter of 20 μm is approximately 2 mm. Due to the mechanical sensitivity of the fiber end piece and its tendency to vibrate, with the corresponding negative effects on the measuring accuracy, the fiber end piece cannot be made substantially longer. This limits the use of the interferometric measuring unit to testing cavities having a relatively shallow depth.

It is therefore an object of the present invention to provide an optical fiber probe which enables high measuring-accuracy testing of cavities having small diameters and great depths with the simplest possible handling.

SUMMARY OF THE INVENTION

The object of the present invention is achieved by providing the optical fiber in the area of the fiber end piece and/or in the area of the mechanical receptacle, at least regionally, with a coating that stabilizes it. The coating functions as a jacket which mechanically stabilizes the optical fiber or the optical fiber end piece. Depending on the selected material and the thickness of the coating, the fiber end piece is thus less sensitive, in particular to bending. Furthermore, the increased mechanical stability reduces the tendency of the fiber end piece to vibrate. The fiber end piece may therefore be made substantially longer compared to known fiber end pieces, which allows cavities having a depth of substantially greater than 2 mm to be optically, in particular interferometrically, tested without the measuring accuracy or the mechanical stability of the optical fiber probe being reduced. The optical fiber probe may thus be also used in measuring machines provided with a probe protection contact. The probe protection contact causes the movement of a probe arm, on which the optical fiber probe is mounted, to be automatically stopped if the probe arm having the fiber end piece comes into contact with the measuring object.

Sufficient mechanical stabilization of the fiber end piece may be achieved by having the coating be made of a varnish, a plastic, of metal, and/or of carbon. In particular, metal plating of the fiber end piece allows the layer thickness to be accurately adjusted to the setpoint value or the layer to be applied by consecutively applying a plurality of layers according to the desired thickness. If the optical fiber is made of a fiber core and a jacket, the light being guided by the reflection in the boundary layer between the fiber core and the jacket, the coating has no effect on the optical properties of the optical fiber or the fiber end piece.

According to a preferred embodiment variant of the present invention, it is provided that the coating is between 10 μm and 100 μm, preferably between 40 μm and 60 μm, thick. Fiber optic probes of the above-described type are preferably used for measuring injector nozzles of internal combustion engines which typically have a diameter of approximately 150 μm. The fiber itself has a thickness of approximately 20 μm. A coating in the above-mentioned thickness provides the fiber end piece with an outer diameter which allows the fiber end piece to be introduced into bore holes of the injector nozzles, while having sufficient mechanical stability. If cavities having larger diameters are to be measured, the coating may also be made thicker.

Further mechanical stabilization of the optical fiber or the fiber end piece may be achieved by providing a protective tube around the optical fiber at least regionally. The protective tube may enclose the optical fiber or the fiber end piece directly or it may be provided in addition to the coating. The inner diameter of the protective tube is to be adjusted accordingly to the outer diameter of the optical fiber or the fiber end piece or the coated optical fiber or the coated fiber end piece. Using this system, cavities having a diameter greater than that of the protective tube may be measured interferometrically. The outer diameter of the protective tube may be selected to be smaller than the diameter of the mechanical receptacle. If the fiber end piece projects from the protective tube, the diameter of the fiber end piece determines the smallest possible measurable diameter at a depth corresponding to the projecting part of the fiber end piece.

Sufficient mechanical protection of the optical fiber or the fiber end piece with the smallest possible outer diameter of the protective tube may be achieved by making the protective tube of metal, ceramic, and/or of carbon.

DETAILED DESCRIPTION

Figure 1:
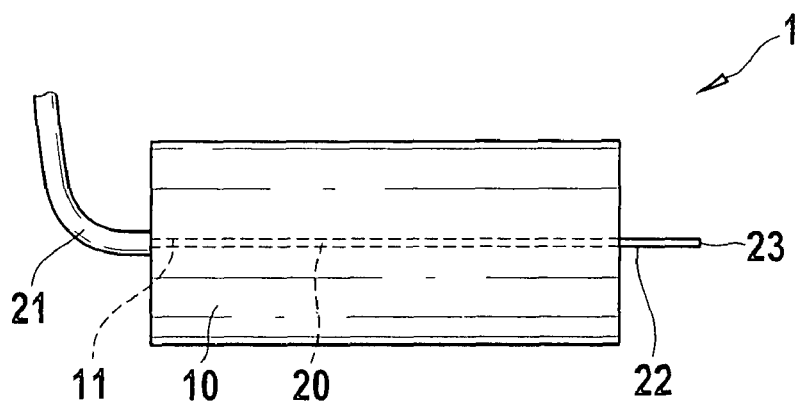
FIG. 1 schematically shows an optical fiber probe according to the related art.

FIG. 1 schematically shows an optical fiber probe 1 as it is used today, for example, for optical, in particular interferometric, measurement of injector nozzles of internal combustion engines.

An optical fiber 20 is inserted into an axial recess 11 of a mechanical receptacle 10. On a portion of optical fiber 20 projecting from mechanical receptacle 10, fiber end piece 22, a lens (not depicted) and a mirror (not depicted) are situated on a fiber tip 23. Optical fiber 20 is connected to a fiber optic light guide 21.

In one exemplary embodiment, optical fiber probe 1 is connected to an interferometer (not depicted) via light guide 21. A light beam is supplied to optical fiber 20 from the interferometer via light guide 21. Optical fiber 20 has, for example, a reflection plane (not depicted) on which the light beam supplied is split into a transmitted measuring beam and a reflected reference beam. The transmitted measuring beam is supplied to fiber end piece 22 and fiber tip 23, and deflected and focused onto the measuring object via the optical components lens and mirror. The beam reflected from the measuring object is reinjected into fiber tip 22 and guided back to the interferometer via optical fiber 20 and light guide 21.

Fiber end piece 22 may be used for performing interferometric measurements, for example, in fine bore holes such as provided in injector nozzles for internal combustion engines. For this purpose, fiber end piece 22 is introduced into the bore hole. The diameter of such bore holes on injector nozzles is approximately 150 µm, while fiber end piece 22 typically has a diameter of approximately 20 µm.

Due to its small diameter, fiber end piece 22 is very fragile. Even a light contact with fiber end piece 22 or a stronger air current may result in fiber end piece 22 being broken off. Replacement of optical fiber probe 1, which then becomes necessary, is associated with high costs. Fiber end piece 22 must therefore be kept as short as possible.

In addition to its mechanical sensitivity, its tendency to vibrate limits the maximum length of the relatively thin fiber end piece 22. In today's optical fiber probes 1, the length of fiber end piece 22 is limited by the vibrations that occur to approximately 2 mm.

Figure 2:
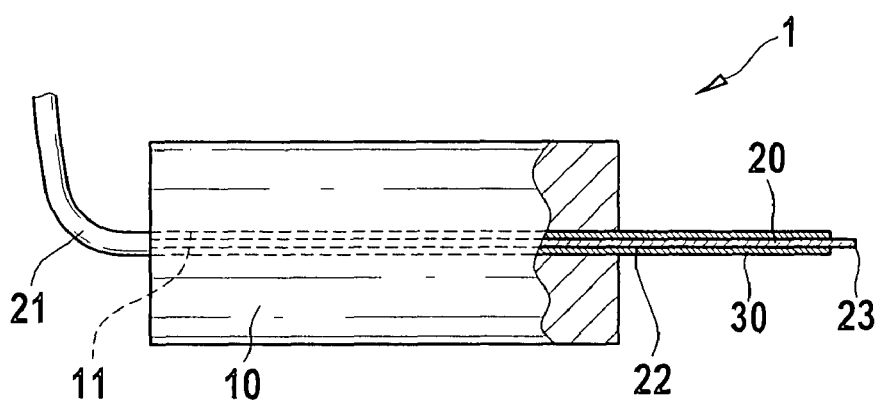
FIG. 2 schematically shows an optical fiber probe having a coated optical fiber and a coated fiber end piece.

FIG. 2 schematically shows an optical fiber probe 1 having a coated optical fiber 20 and a coated fiber end piece 22. In addition to the components already described in FIG. 1, a coating 30 is depicted. Fiber tip 23 carrying the optical components is not coated.

Coating 30 may be made of different materials, in the present exemplary embodiment of metal.

Compared to an uncoated fiber end piece 22, fiber end piece 22 has a substantially improved mechanical stability, which, on the one hand, increases its mechanical load-bearing capacity and, on the other hand, reduces the occurrence of vibrations which reduce the measuring accuracy. Compared to known fiber end pieces 22, fiber end piece 22 may be made longer; therefore, deeper cavities may be measured.

The increased mechanical stability of coated fiber end piece 22 also makes it possible to use optical fiber probe 1 on measuring machines having a probe protection contact. The probe protection contact results in automatic shutoff of the movement of a probe arm if the probe arm having fiber end piece 22, for example, comes into contact with the measuring object.

Figure 3:
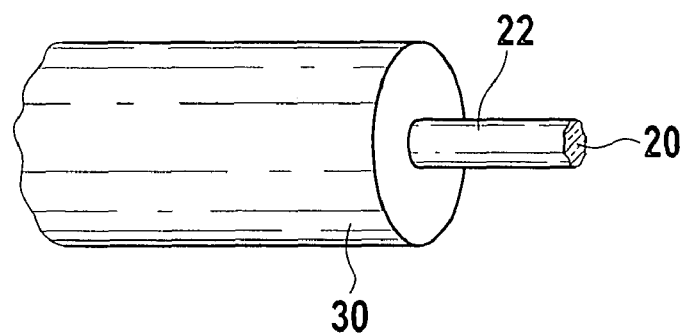
FIG. 3 schematically shows a detailed view of the coated fiber end piece.

FIG. 3 shows a detailed view of fiber end piece 22 depicted in FIG. 2 having surrounding coating 30 depicted not to scale. The approximately 50 µm thickness of coating 30 is considerably greater than the approximately 20 µm diameter of actual fiber end piece 22. The resulting overall thickness of approximately 120 µm makes it possible to interferometrically measure bore holes of injector nozzles having a typical diameter of approximately 150 µm.

Figure 4:
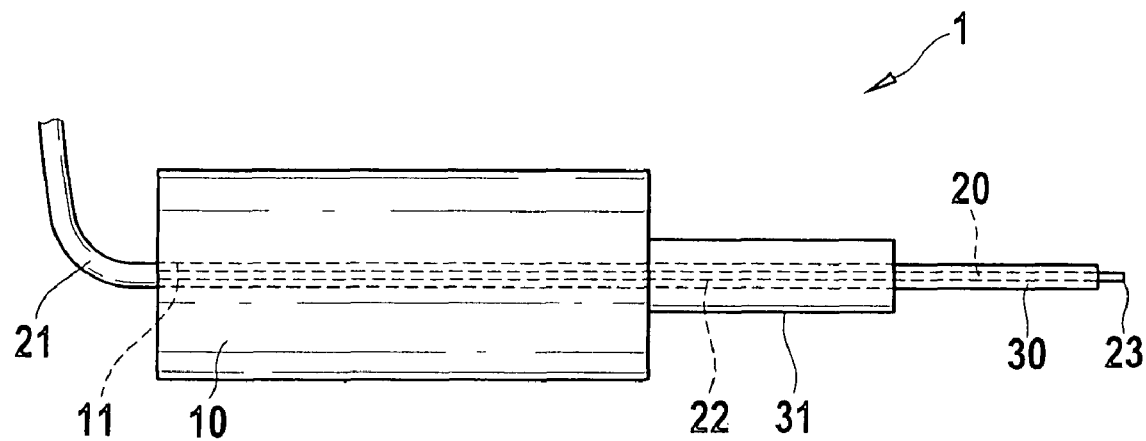
FIG. 4 schematically shows an optical fiber probe having a coated optical fiber probe, a coated fiber end piece, and a protective tube.

FIG. 4 schematically shows an optical fiber probe 1 having a coated optical fiber 20 and a coated fiber end piece 22. In addition to the components introduced in the previous figures, fiber end piece 22 is provided with a protective tube 31. Protective tube 31 includes coating 30 of fiber end piece 22.

In the embodiment variant depicted, protective tube 31 ends with mechanical receptacle 10. However, variants in which protective tube 31 is also provided in the area of mechanical receptacle 10 via optical fiber 20 and held by mechanical receptacle 10 are also possible.

Protective tube 31 further improves the mechanical stability of fiber end piece 22 and reduces its tendency to vibrate. The front end of fiber end piece 22 may remain free, so that the smallest measurable diameter is determined by the diameter of coated fiber end piece 22. For deeper bore holes, the outer diameter of protective tube 31 is then decisive, which, however, may be made considerably smaller than the diameter of mechanical receptacle 10. The maximum length of fiber end piece 22 may be further substantially increased due to protective tube 31.

Figure 5:
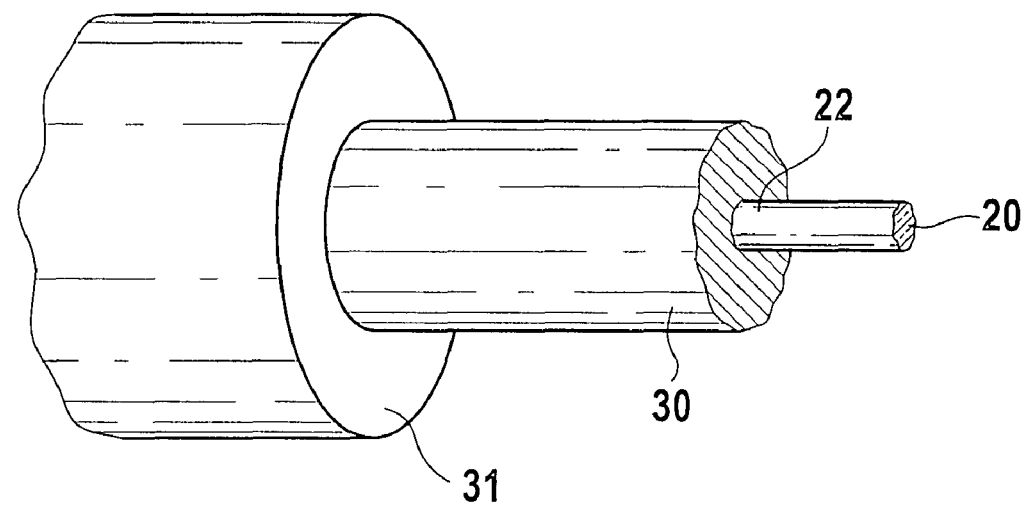
FIG. 5 schematically shows a detailed view of the coated fiber end piece having a protective tube.

FIG. 5 shows a detailed view of fiber end piece 22 depicted in FIG. 4 having surrounding coating 30 and the end piece of protective tube 31, depicted not to stale.

Protective tube 31 may be manufactured of metal, ceramic, or of carbon. The connection to fiber end piece 22 or to coating 30 may be established by gluing, for example.

What is claimed is:

1. An optical fiber probe for an optical measuring device comprising:
    an optical fiber having an uncoated tip;
    a mechanical receptacle into which the optical fiber is inserted; and
    a fiber end piece projecting beyond the mechanical receptacle, the fiber end piece being for guiding a measuring beam onto a measuring object,
    wherein the optical fiber in an area of at least one of (a) around an outside diameter of the fiber end piece and (b) the mechanical receptacle is provided, at least regionally, with a coating that stabilizes it mechanically,
    wherein the coating is between 10 µm and 100 µm thick.

2. The optical fiber probe according to claim 1, wherein the coating is composed of at least one of a varnish, a plastic, metal, and carbon.

3. The optical fiber probe according to claim 1, wherein the coating is between 40 µm and 60 µm thick.

4. The optical fiber probe according to claim 1, further comprising a protective tube situated around the optical fiber, at least regionally.

5. The optical fiber probe according to claim 4, wherein the protective tube is composed of at least one of metal, ceramic, and carbon.

6. The optical fiber probe according to claim 4, wherein the protective tube is situated around the coating, at least regionally.

7. The optical fiber probe according to claim 4, wherein the protective tube is provided in the area of the mechanical receptacle.

8. The optical fiber probe according to claim 1, wherein the tip of the optical fiber is provided with optical components.

9. The optical fiber probe according to claim 1, wherein the optical fiber is provided, at least regionally, with a coating that stabilizes it mechanically, in an area of both (a) the fiber end piece and (b) the mechanical receptacle.

10. The optical fiber probe according to claim 1, wherein the outside diameter of the coated optical fiber is larger than an outside diameter of the optical fiber itself.

* * * * *